(12) United States Patent
Taniguchi et al.

(10) Patent No.: US 11,614,145 B2
(45) Date of Patent: Mar. 28, 2023

(54) GEAR DEVICE

(71) Applicant: SHIROKI CORPORATION, Fujisawa (JP)

(72) Inventors: Mitsugu Taniguchi, Fujisawa (JP); Masayuki Shibata, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 17/402,664

(22) Filed: Aug. 16, 2021

(65) Prior Publication Data

US 2022/0056986 A1 Feb. 24, 2022

(30) Foreign Application Priority Data

Aug. 19, 2020 (JP) .............................. JP2020-138564

(51) Int. Cl.
*F16H 1/16* (2006.01)
*F16H 55/18* (2006.01)
*F16H 37/04* (2006.01)

(52) U.S. Cl.
CPC ............. *F16H 1/16* (2013.01); *F16H 37/041* (2013.01); *F16H 55/18* (2013.01); *F16H 2055/185* (2013.01)

(58) Field of Classification Search
CPC .... F16H 37/041; F16H 57/031; F16H 57/021; F16H 2057/0213; F16H 2057/02034; H02K 7/1166
See application file for complete search history.

(56) References Cited

U.S. PATENT DOCUMENTS

| 5,398,564 | A | * | 3/1995 | Yoshida | H02K 7/1166 464/92 |
|---|---|---|---|---|---|
| 7,291,951 | B2 | * | 11/2007 | Takiguchi | B60Q 1/076 310/67 R |
| 7,520,366 | B2 | * | 4/2009 | Kuroumaru | F16H 57/023 180/444 |
| 8,201,478 | B2 | * | 6/2012 | Ramirez, Jr. | H02K 7/1166 74/606 R |
| 8,677,848 | B2 | * | 3/2014 | Koga | F16H 1/18 74/425 |
| 2002/0064051 | A1 | * | 5/2002 | Sugimoto | B60Q 1/12 362/531 |
| 2010/0060061 | A1 | | 3/2010 | Koga et al. | |

(Continued)

FOREIGN PATENT DOCUMENTS

JP 2010064619 A 3/2010

*Primary Examiner* — Jake Cook
(74) *Attorney, Agent, or Firm* — Buchanan Ingersoll & Rooney PC (57) ABSTRACT

A gear device includes a housing, a cover, and a positioning portion. The cover includes a first bearing that receives a first shaft and a second bearing that receives a second shaft. The positioning portion includes a projection that projects from one of the housing or the cover parallel to the first shaft or the second shaft and a fitting hole that is formed in the other one of the housing or the cover to receive the projection. The projection has a length that is set so that when coupling the cover to the housing, in a state in which the first shaft is inserted through the first bearing, the projection enters the fitting hole before the distal end of the second shaft enters the second bearing.

4 Claims, 6 Drawing Sheets

(56) References Cited

U.S. PATENT DOCUMENTS

2011/0265594 A1* 11/2011 Ramirez, Jr. ......... F16H 57/039
                                                    74/416
2019/0277079 A1*  9/2019 Lange ................... E05F 15/697
2021/0388898 A1* 12/2021 Sakai ..................... F16H 61/32
2022/0056993 A1*  2/2022 Hirabayashi ............. H02K 5/24

* cited by examiner

GEAR DEVICE

BACKGROUND

1. Field

The present disclosure relates to a gear device including gears.

2. Description of Related Art

Japanese Laid-Open Patent Publication No. 2010-64619 describes a typical gear device that includes a housing, gears accommodated in the housing, and a cover that covers an opening of the housing.

The cover includes a bearing for receiving a shaft, which supports a helical gear, and a through-hole, through which a shaft supporting a spur gear extends.

When the cover is engaged with the shafts in this manner, the cover is coupled to the housing using the shafts. In this case, the differences in the dimensions of the shafts and how the shafts are coupled affect the coupling and positioning of the cover to the housing. This makes it difficult to guide the cover to the intended coupling position.

SUMMARY

It is an objective of the present disclosure to provide a gear device allowing its cover to be easily guided to the coupling position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a gear device includes a housing that accommodates gears, a cover that covers an opening of the housing, and a positioning portion that positions the cover relative to the housing. The cover includes a first bearing that receives a first shaft of one of the gears and a second bearing that receives a second shaft of another one of the gears. The positioning portion guides the cover to a predetermined position on the housing and includes a projection that projects from one of the housing or the cover parallel to the first shaft or the second shaft and a fitting hole that is formed in the other one of the housing or the cover to receive the projection. The projection has a length that is set so that when coupling the cover to the housing, in a state in which the first shaft is inserted through the first bearing, the projection enters the fitting hole before a distal end of the second shaft enters the second bearing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A gear device 1 will now be described with reference to FIGS. 1 to 11. The gear device 1 is attached to a motor 2 or any of various types of actuators. In one example, the gear device 1 is attached to the motor 2. Examples of devices that use the gear device 1 include a motor unit 3.

Figure 1:
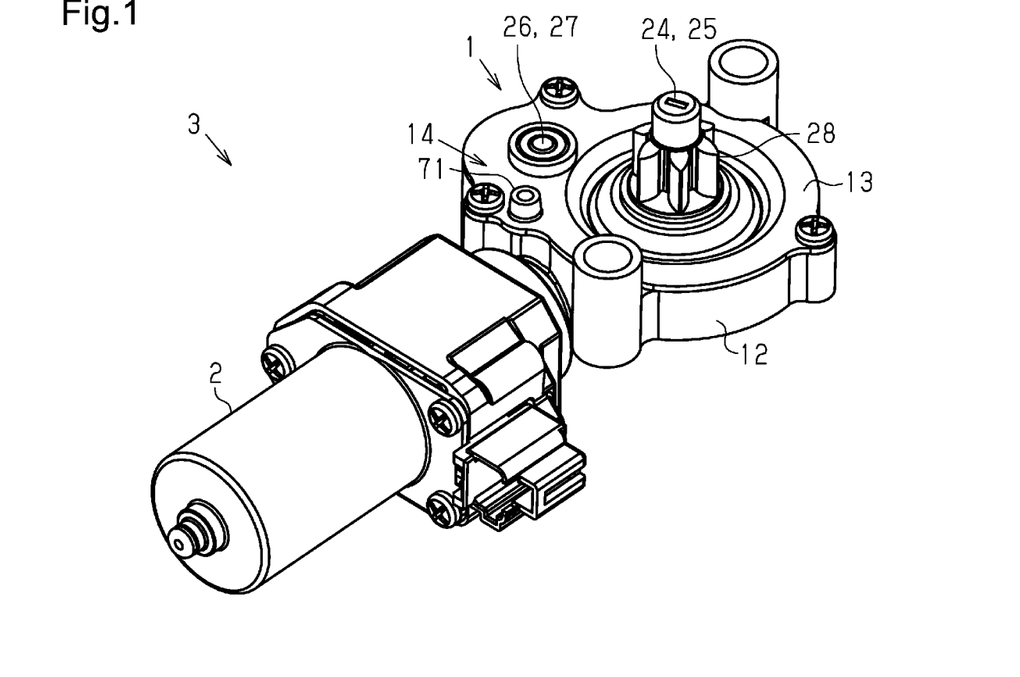
FIG. 1 is a perspective view of a motor unit.
Figure 2:
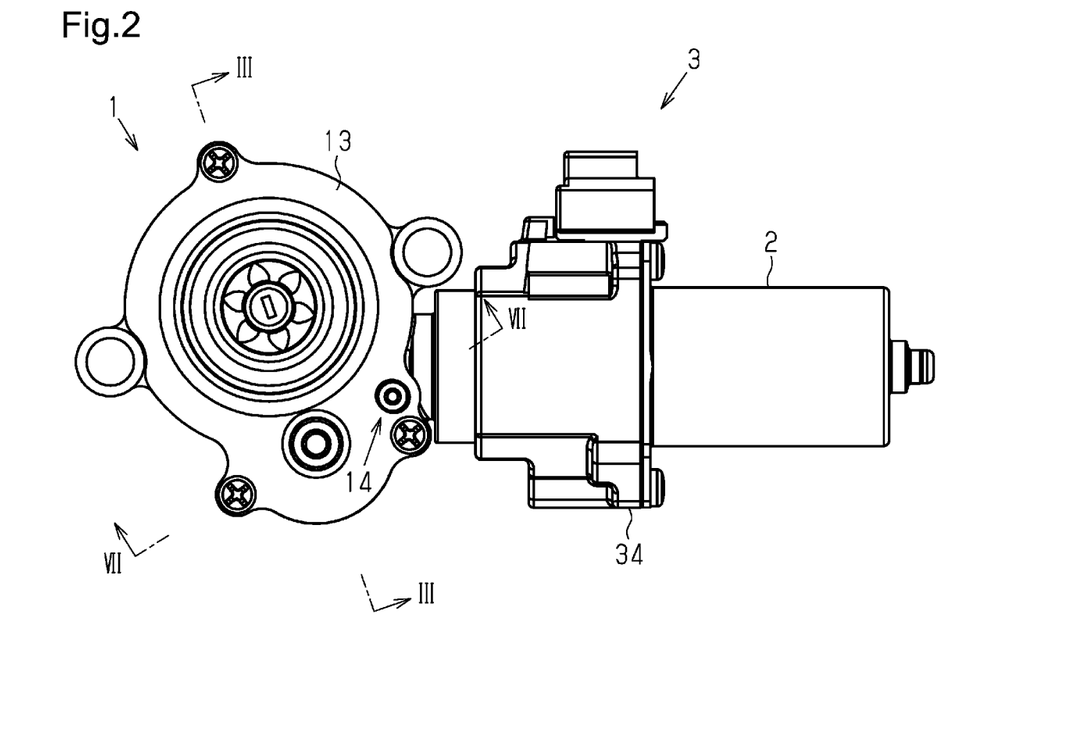
FIG. 2 is a plan view of the motor unit.

FIG. 1 is a perspective view of the motor unit 3. FIG. 2 is a plan view of the motor unit 3. The motor unit 3 is attached to, for example, a vehicle seat. In one example, the motor unit 3 serves as a power generator of an actuator that changes the inclination angle of the vehicle seat. In another example, the motor unit 3 serves as a power generator of an actuator for moving the vehicle seat in the vertical direction or the front-rear direction. The motor unit 3 includes the motor 2 and the gear device 1. The gear device 1 of the present embodiment decreases the rotation speed of the output shaft of the motor 2.

Figure 3:
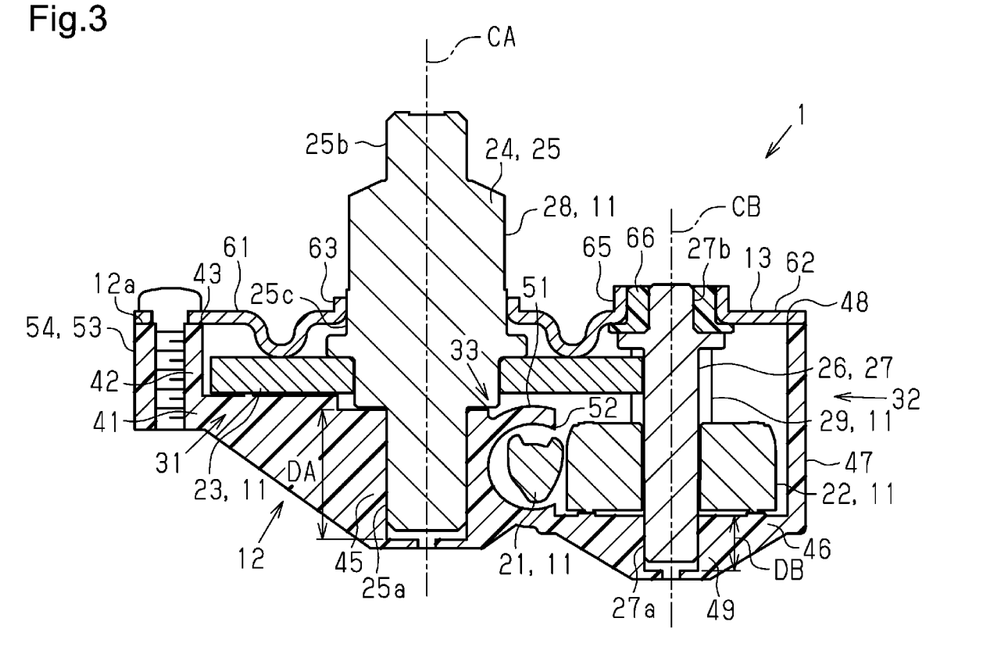
FIG. 3 is a cross-sectional view of a gear device taken along line in FIG. 2.
Figure 4:
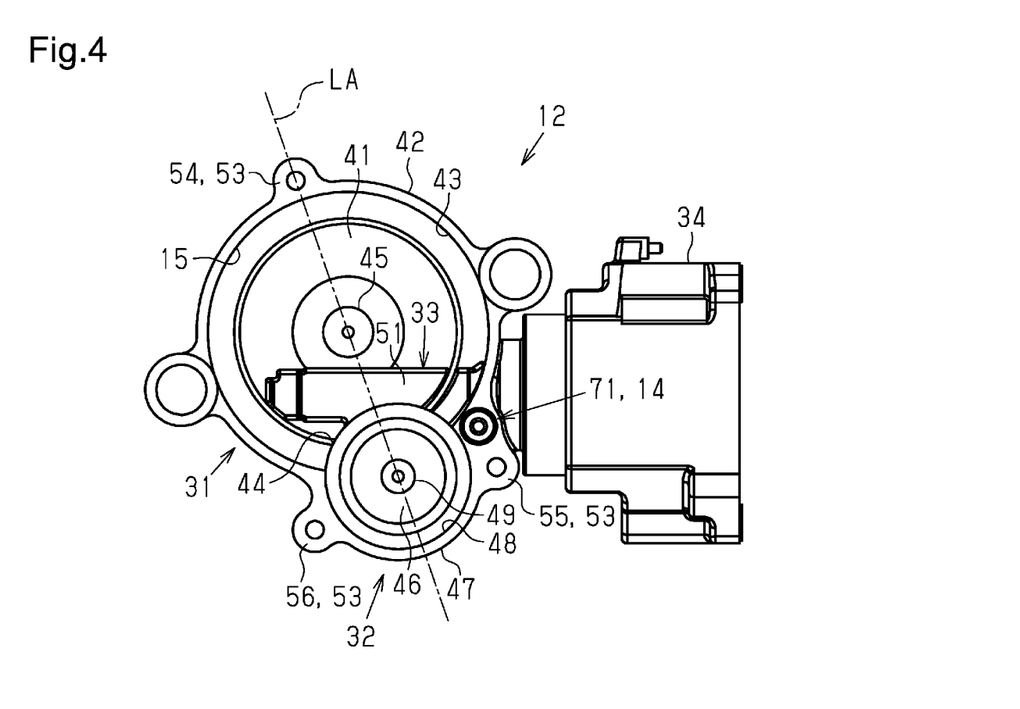
FIG. 4 is a plan view of a housing.
Figure 5:
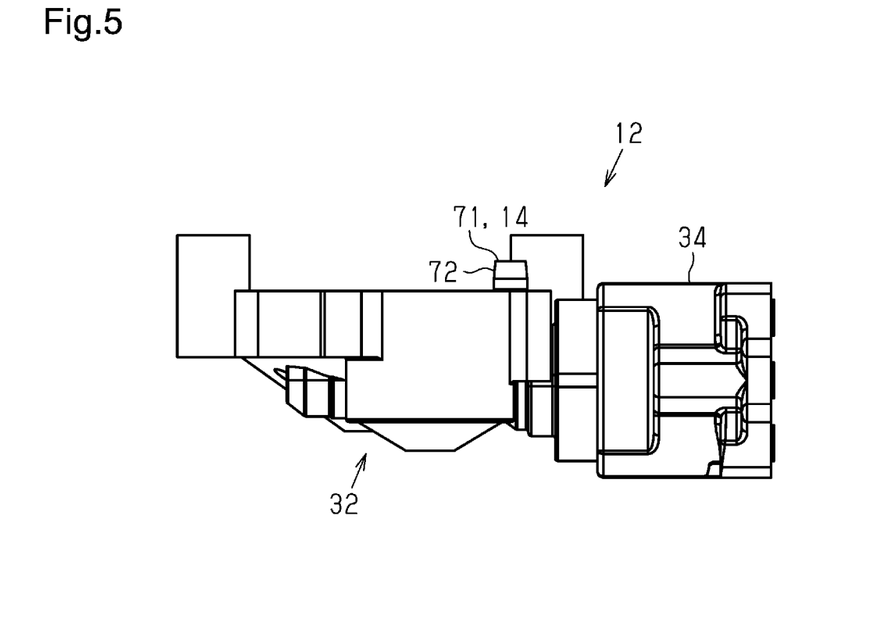
FIG. 5 is a side view of the housing.
Figure 6:
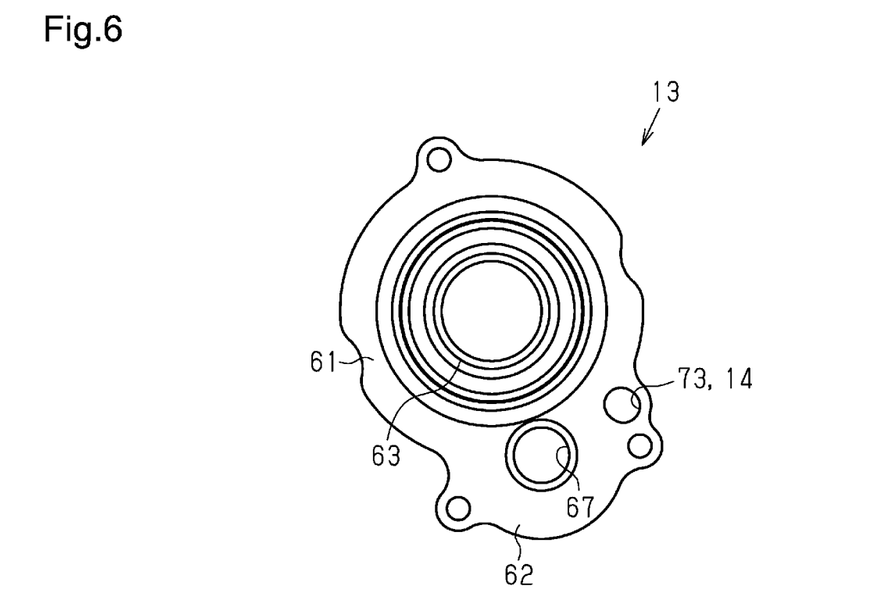
FIG. 6 is a plan view of a cover.

FIG. 3 is a cross-sectional view of the gear device 1 taken along line in FIG. 2. FIG. 4 is a plan view of a housing 12. FIG. 5 is a side view of the housing 12. FIG. 6 is a plan view of a cover 13.

The gear device 1 includes gears 11, the housing 12 that accommodates the gears 11, the cover 13 that covers an opening 15 of the housing 12, and a positioning portion 14.

The gears 11 of the gear device 1 include a worm 21 connected to the output shaft of the motor 2, a worm wheel 22 moved in cooperation with the worm 21, a driving gear 23 moved in cooperation with the worm wheel 22, an output gear 28, and an intermediate gear 29. The gear device 1 further includes a driving shaft 24 that supports the driving gear 23 and a worm wheel shaft 26 that supports the worm wheel 22. The driving shaft 24 includes the output gear 28. The worm wheel shaft 26 includes the intermediate gear 29.

With respect to members extending through the cover 13 such as the driving shaft 24 and the worm wheel shaft 26, the member passed through the cover 13 first when the cover 13 is coupled to the housing 12 is defined as a first shaft 25, and the member passed through the cover 13 second when the cover 13 is coupled to the housing 12 is defined as a second shaft 27. In the present embodiment, when the cover 13 is coupled to the housing 12, the member passed through the cover 13 first is the driving shaft 24. Thus, the driving shaft 24 will be referred to as the first shaft 25. The member passed through the cover 13 second is the worm wheel shaft 26. Thus, the worm wheel shaft 26 will be referred to as the second shaft 27.

The first shaft 25 is rotated integrally with the driving gear 23. The first shaft 25 is supported rotatably by the cover 13 and a first bottom wall 41 of the housing 12. The first shaft 25 includes a first end 25a, a second end 25b at the opposite side of the first end 25a, and an intermediate portion 25c located at a middle part between the first end 25a and the second end 25b.

The first end 25a of the first shaft 25 is received by a first housing bearing 45 of the housing 12. The first housing bearing 45 has a depth DA that is greater than a depth DB of a second housing bearing 49. The intermediate portion 25c of the first shaft 25 is received by a first bearing 63 of the cover 13.

When the first shaft 25 and the second shaft 27 are attached to the housing 12, the first shaft 25 is arranged parallel to the second shaft 27. The first shaft 25 is longer than the second shaft 27. The second end 25b of the first shaft 25 is located further away from an end surface 12a of the open side of the housing 12 than a second end 27b of the second shaft 27 in the direction of the rotation axis of the driving gear 23 (hereafter referred to as first rotation axis CA).

The output gear 28 is rotated integrally with the first shaft 25. The output gear 28 may be formed integrally with the first shaft 25. The output gear 28 is arranged on a portion of the first shaft 25 that is exposed from the housing 12. Specifically, the output gear 28 is arranged on a portion of the first shaft 25 between the intermediate portion 25c and the second end 25b. The output gear 28 has the same rotation axis as the first rotation axis CA of the driving gear 23. The output gear 28 has a diameter that is less than the diameter of the driving gear 23. The output gear 28 transfers rotational force to other devices.

The second shaft 27 is rotated integrally with the worm wheel 22. The second shaft 27 is rotatably supported by the cover 13 and a second bottom wall 46 of the housing 12. The second shaft 27 includes a first end 27a and the second end 27b at the opposite side of the first end 27a. The first end 27a of the second shaft 27 is received by the second housing bearing 49 of the housing 12. The second end 27b of the second shaft 27 is received by a second bearing 65 of the cover 13.

The intermediate gear 29 is rotated integrally with the worm wheel 22. The intermediate gear 29 has the same rotation axis as the rotation axis of the worm wheel 22 (hereafter second rotation axis CB). The intermediate gear 29 may be formed integrally with the second shaft 27. The intermediate gear 29 meshes with the driving gear 23. The intermediate gear 29 has a diameter that is less than the diameter of the worm wheel 22.

The rotational force of the output shaft of the motor 2 is transferred by the worm 21 to the worm wheel 22 and then further transferred by the intermediate gear 29, which is rotated integrally with the worm wheel 22, to the driving gear 23. Rotation of the driving gear 23 rotates the output gear 28.

As shown in FIG. 4, the housing 12 includes a first accommodating portion 31 that accommodates at least part of the driving gear 23, a second accommodating portion 32 that accommodates the worm wheel 22, and a third accommodating portion 33 that accommodates the worm 21. The housing 12 further includes a motor mount 34 to which the motor 2 is attached. The motor 2 is attached to the motor mount 34 by bolts.

The first accommodating portion 31 includes the first bottom wall 41 and a first peripheral wall 42. The first accommodating portion 31 includes an opening that serves as a first opening 43 at an end opposed to the first bottom wall 41 in the direction of the first rotation axis CA of the driving gear 23. The first opening 43 is sized to allow for insertion of the driving gear 23.

The first peripheral wall 42 is tubular to oppose the toothed surface of the driving gear 23. The first peripheral wall 42 includes a cutout portion 44. The first accommodating portion 31 is connected to the second accommodating portion 32 by the cutout portion 44. The driving gear 23 meshes with the intermediate gear 29 at the cutout portion 44. The first bottom wall 41 includes the first housing bearing 45 that receives the first end 25a of the first shaft 25.

The second accommodating portion 32 includes the second bottom wall 46 and a second peripheral wall 47. The second accommodating portion 32 includes an opening that serves as a second opening 48 at an end opposed to the second bottom wall 46 in the direction of the second rotation axis CB of the worm wheel 22. The second opening 48 is sized to allow for insertion of the worm wheel 22. The second opening 48 is connected to the first opening 43. The first opening 43 and the second opening 48 form the opening 15 of the housing 12. The second peripheral wall 47 is tubular to oppose the toothed surface of the worm wheel 22. The second bottom wall 46 includes the second housing bearing 49 that receives the first end 27a of the second shaft 27.

The third accommodating portion 33 includes a third peripheral wall 51 that surrounds the worm 21. The third peripheral wall 51 is arranged in contact with the second peripheral wall 47 of the second accommodating portion 32 (refer to FIG. 3). The third accommodating portion 33 includes a connection portion 52 connected to the second accommodating portion 32 (refer to FIG. 3). The third accommodating portion 33 is connected to the second accommodating portion 32 by the connection portion 52. The worm 21 inside the connection portion 52 is exposed to the second accommodating portion 32 and meshed with the worm wheel 22. The third accommodating portion 33 is connected to the motor mount 34.

The housing 12 includes a cover mount 53. The cover mount 53 includes three insertion portions (hereafter referred to as first insertion portion 54 to third insertion portion 56) into which three fastening members for fastening the cover 13 are inserted.

In plan view, the first insertion portion 54 is arranged near an intersection point of the outer surface of the first peripheral wall 42 of the first accommodating portion 31 and a line extending through the first rotation axis CA of the driving gear 23 and the second rotation axis CB of the worm wheel 22 (hereafter referred to as axis connection line LA). In plan view, the second insertion portion 55 is arranged extending along the outer surface of the second peripheral wall 47 of the second accommodating portion 32 near the motor mount 34. In plan view, the third insertion portion 56 is arranged along the outer surface of the second peripheral wall 47 of the second accommodating portion 32 at the side of the axis connection line LA that is opposite to the second insertion portion 55. The first insertion portion 54, the second insertion portion 55, and the third insertion portion 56 are arranged on the housing 12 so that the first housing bearing 45 and the second housing bearing 49 are located inside a triangular area formed by the first insertion portion 54, the second insertion portion 55, and the third insertion portion 56.

As shown in FIG. 6, the cover 13 includes a first cover portion 61 that covers the first opening 43 of the first accommodating portion 31 and a second cover portion 62 that covers the second opening 48 of the second accommodating portion 32. The cover 13 includes the first bearing 63 and the second bearing 65 (refer to FIG. 3). The first bearing 63 receives the first shaft 25 of the driving gear 23. The second bearing 65 receives the second shaft 27 of the worm wheel 22.

As shown in FIG. 3, the first bearing 63 is arranged in the first cover portion 61. The first bearing 63 receives the intermediate portion 25c of the first shaft 25. The first bearing 63 contacts the intermediate portion 25c of the first shaft 25. As shown in FIG. 3, the second bearing 65 is arranged in the second cover portion 62. The second bearing 65 receives the second end 27b of the second shaft 27. The second bearing 65 contacts the second end 27b of the second shaft 27. The second bearing 65 includes a tubular member 66 that is fitted into a through-hole 67 extending through the cover 13.

Figure 7:
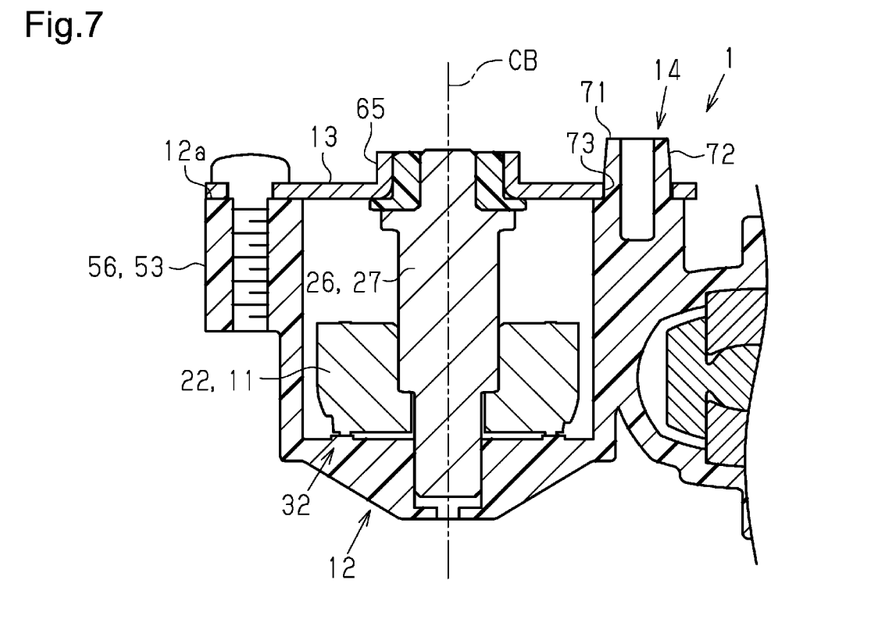
FIG. 7 is a cross-sectional view of the gear device taken along line VII-VII in FIG. 2.

The positioning portion 14 will now be described with reference to FIGS. 7 to 9. The positioning portion 14 positions the cover 13 relative to the housing 12. The positioning portion 14 includes a projection 71 and a fitting hole 73 into which the projection 71 is fitted. The projection 71 and the fitting hole 73 are configured to guide the cover 13 to a predetermined position of the housing 12 through contact between the projection 71 and the fitting hole 73.

The projection 71 is arranged on one of the housing 12 or the cover 13. The fitting hole 73 is arranged in the other one of the housing 12 or the cover 13. In the present embodiment, the projection 71 is arranged on the housing 12, and the fitting hole 73 is arranged in the cover 13.

The projection 71 projects from the housing 12 parallel to the first shaft 25 or the second shaft 27. The projection 71 is arranged on the second peripheral wall 47 of the second accommodating portion 32 proximate to the second insertion portion 55. Preferably, the projection 71 has a distal end that includes a tapered portion 72.

Figure 11:
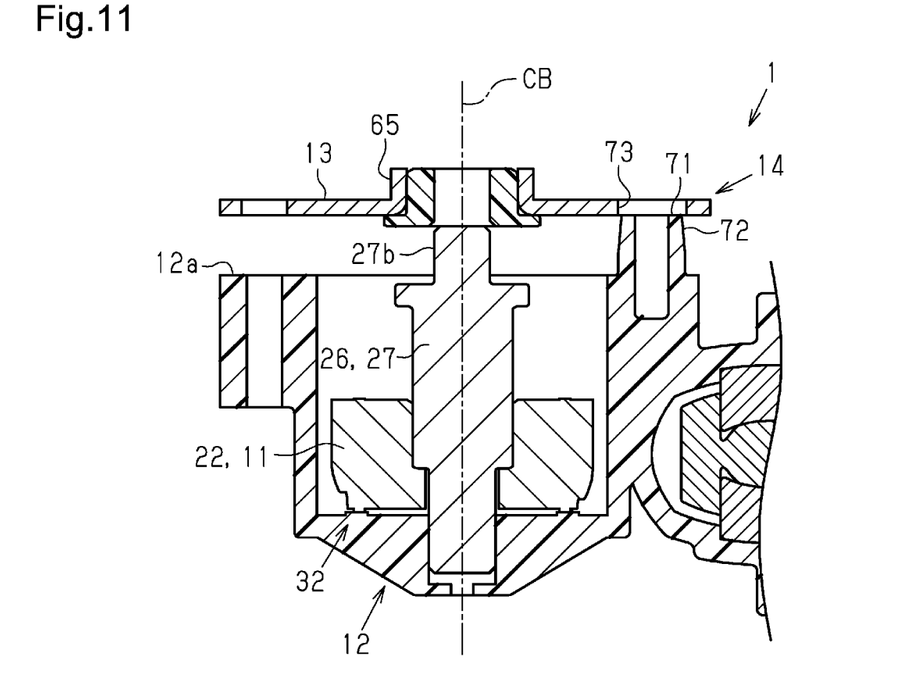
FIG. 11 is a cross-sectional view of the gear device when the cover is coupled to the housing.

The projection 71 has a length that is set so that when the cover 13 is moved toward the housing 12 to couple the cover 13 to the housing 12, in a state in which the first shaft 25 is inserted through the first bearing 63, the projection 71 enters the fitting hole 73 before the distal end of the second shaft 27 enters the second bearing 65 (refer to FIG. 11).

The phrase of "before the distal end of the second shaft 27 enters the second bearing 65" includes the point of time at which the distal end of the second shaft 27 starts to enter the second bearing 65 and a period up to that point of time during which the cover 13 is moved toward the housing 12.

Specifically, in a state in which the second shaft 27 is attached to the housing 12, the distal end of the second end 27b of the second shaft 27 is arranged flush with the distal end of the projection 71 in the direction of the second rotation axis CB of the worm wheel 22 or closer to the second bottom wall 46 of the housing 12 than the distal end of the projection 71.

The second shaft 27 has a length that is set so that when the cover 13 is coupled to the housing 12, the tapered portion 72 of the projection 71 will be fitted in the fitting hole 73 of the cover 13, and the distal end of the second shaft 27 will be fitted in the second bearing 65.

Specifically, in a state in which the second shaft 27 is attached to the housing 12, the distal end of the second end 27b of the second shaft 27 is flush with the distal end of the tapered portion 72 of the projection 71 in the direction of the second rotation axis CB of the worm wheel 22 or closer to the end surface 12a of the open side of the housing 12 than the distal end of the tapered portion 72 of the projection 71.

The structures of the projection 71 and the fitting hole 73 will now be described with reference to FIGS. 8 and 9.

When the cover 13 is coupled to the housing 12 and the housing 12 is viewed in the direction of the second rotation axis CB of the worm wheel 22, a gap is formed between the projection 71 and the wall of the fitting hole 73.

The gap between the projection 71 and the wall of the fitting hole 73 includes a first gap portion SA in a rotation direction DC of the first shaft 25 and a second gap portion SB in a radial direction DD of the first shaft 25. The first gap portion SA is smaller than the second gap portion SB. The first gap portion SA is defined as the distance between the side surface of the projection 71 and the wall surface of the fitting hole 73 in the rotation direction DC of the first shaft 25. The second gap portion SB is defined as the distance between the side surface of the projection 71 and the wall surface of the fitting hole 73 in the radial direction DD of the first shaft 25. The radial direction DD of the first shaft 25 is defined as the direction extending along a line that passes through the center of the first shaft 25 and the center of the projection 71.

Figure 8:
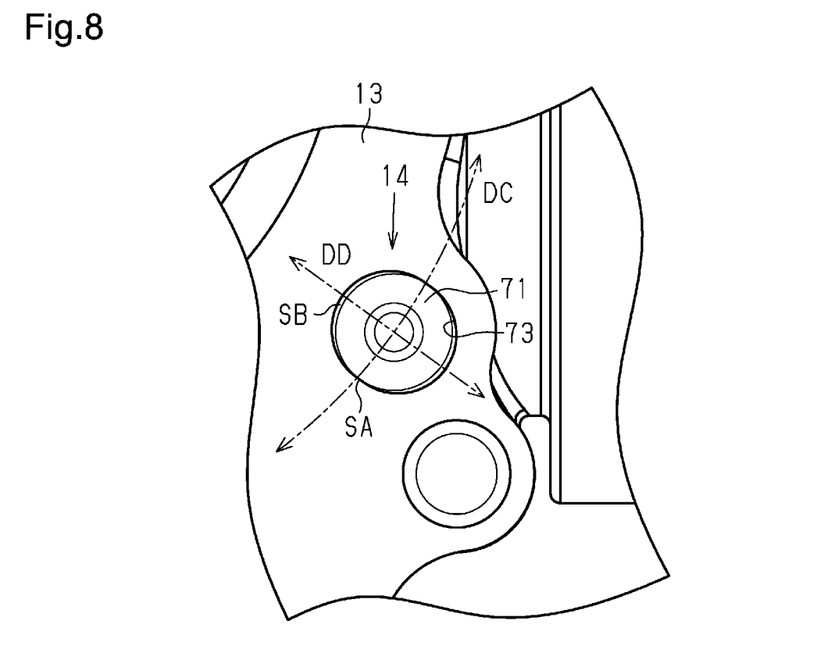
FIG. 8 is an enlarged view of a positioning portion.

In the present embodiment, as shown in FIG. 8, the projection 71 is circular as viewed in a direction parallel to the first rotation axis CA of the driving gear 23. The fitting hole 73 is elliptic. Specifically, the fitting hole 73 has a major axis that extends in the radial direction DD.

Figure 9:
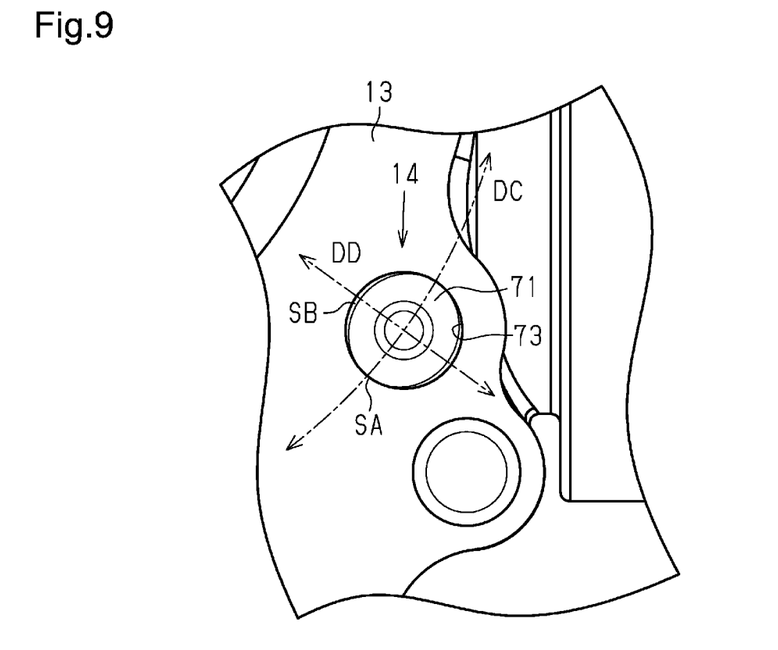
FIG. 9 is an enlarged view of a positioning portion in another example.

In another example, as shown in FIG. 9, the fitting hole 73 is circular as viewed in the direction parallel to the first rotation axis CA of the driving gear 23. The projection 71 has an elliptic cross section. Specifically, the projection 71 has a minor axis that extends in the radial direction DD.

Figure 10:
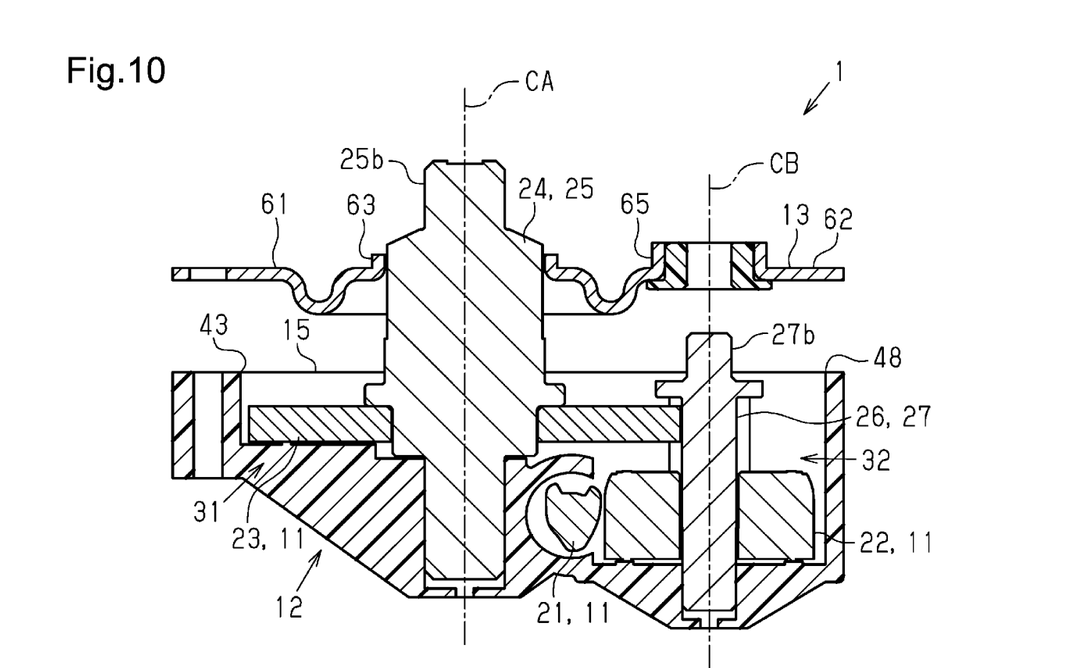
FIG. 10 is a cross-sectional view of the gear device when the cover is coupled to the housing.

The coupling of the cover 13 to the housing 12 will now be described with reference to FIGS. 10 and 11.

Before coupling the cover 13, various components are arranged in the housing 12. Specifically, the first shaft 25 including the output gear 28, the second shaft 27 including the intermediate gear 29, the worm 21, the worm wheel 22, and the driving gear 23 are arranged in the housing 12. Since the depth DA of the first housing bearing 45 is greater than the depth DB of the second housing bearing 49, the first shaft 25 is less inclined than the second shaft 27 before the cover 13 is coupled to the housing 12. The first shaft 25 is designed so that its axis substantially corresponds to the first rotation axis CA of the driving gear 23.

Then, the cover 13 is coupled to the housing 12. Specifically, the cover 13 is held parallel to the opening 15 of the housing 12. The cover 13 is moved toward the housing 12 so that the first shaft 25 enters the first bearing 63 of the cover 13 as shown in FIG. 10. The cover 13 is positioned in a state rotatable about the first shaft 25. The cover 13 is further moved toward the housing 12 so that the projection 71 of the housing 12 enters the fitting hole 73 of the cover 13 as shown in FIG. 11. When the tapered portion 72 of the projection 71 of the housing 12 enters the fitting hole 73 of the cover 13, the cover 13 is substantially positioned relative to the housing 12. In this case, the inclination of the second shaft 27 is adjusted by inserting the second shaft 27 into the second bearing 65 of the cover 13 while adjusting the position of the cover 13. Then, the cover 13 is brought into contact with the housing 12 and fastened.

The operation of the present embodiment will now be described.

The cover 13 includes the first bearing 63, which receives the first shaft 25, and the second bearing 65, which receives the second shaft 27. When arranging the cover 13 at the coupling position after inserting the first shaft 25 in the first bearing 63 and the second shaft 27 is in the second bearing 65 of the cover 13, the first shaft 25 and the second shaft 27 may be inclined in any direction in plan view. This may cause difficulties for guiding the cover 13 to the coupling position. In contrast, the projection 71 and the first shaft 25 of the present embodiment, which are arranged in the housing 12, position the cover 13 in the proximity of the coupling position. This guides the cover 13 to the coupling position and allows for smooth coupling of the cover 13 to the housing 12.

The present embodiment has the following advantages.

(1) The positioning portion 14 of the gear device 1 includes the projection 71, which projects from one of the housing 12 or the cover 13 parallel to the first shaft 25 or the second shaft 27, and the fitting hole 73, which is formed in the other one of the housing 12 or the cover 13 to receive the projection 71. The length of the projection 71 is set so that when the cover 13 is coupled to the housing 12, in a state in which the first shaft 25 is inserted through the first bearing 63, the projection 71 enters the fitting hole 73 before the distal end of the second shaft 27 enters the second bearing 65.

With this structure, when coupling the cover 13 to the housing 12, in a state in which the first shaft 25 is inserted through the first bearing 63, the projection 71 enters the fitting hole 73 at the same time as when the distal end of the second shaft 27 enters the second bearing 65 or before the distal end of the second shaft 27 enters the second bearing 65. This guides the cover 13 to the coupling position on the housing 12.

(2) In the gear device 1, the distal end of the projection 71 includes the tapered portion 72. With this structure, the cover 13 is guided to the coupling position on the housing 12. This improves the coupling efficiency.

(3) In the gear device 1, the length of the second shaft 27 is set so that the distal end of the second shaft 27 is fitted in the second bearing 65 when the tapered portion 72 of the projection 71 is located in the fitting hole 73. With this structure, the cover 13 is allowed to move relative to the housing 12 when the tapered portion 72 is located in the fitting hole 73. Thus, the second shaft 27 can be smoothly fitted into the second bearing 65. This allows the cover 13 to be coupled further smoothly to the housing 12.

(4) In the gear device 1, the gap between the projection 71 and the wall of the fitting hole 73 includes the first gap portion SA in the rotation direction DC of the first shaft 25 and the second gap portion SB in the radial direction DD of the first shaft 25. The first gap portion SA is smaller than the second gap portion SB.

This structure restricts movement of the cover 13 relative to the housing 12. Specifically, movement of the cover 13 is restricted in the rotation direction DC of the first shaft 25. This reduces displacement of the cover 13 from the coupling position. The second gap portion SB in the radial direction DD of the first shaft 25 allows the cover 13 to be moved by a certain extent, reduces difficulties during coupling of the cover 13 that may be caused by dimensional variations in components of the gear device 1, and avoids displacement of the projection 71 relative the fitting hole 73. This smoothly guides the cover 13 to the coupling position.

Other Embodiments

The above embodiment is not limited to the example of the above structure. The above embodiment may be modified as follows. In the following modifications, the components that are substantially unchanged from the corresponding components of the above embodiment will be given the same reference numerals as in the above embodiment.

When the cover 13 is coupled to the housing 12 in the gear device 1 of the present embodiment, the member that passes through the cover 13 first is the driving shaft 24, and the member that passes through the cover 13 second is the worm wheel shaft 26. Thus, the driving shaft 24 is referred to as the first shaft 25, and the worm wheel shaft 26 is referred to as the second shaft 27. Instead, when the worm wheel shaft 26 is longer than the driving shaft 24 and the cover 13 is coupled to the housing 12, the member that passes through the cover 13 first may be the worm wheel shaft 26. In this case, the worm wheel shaft 26 is defined as the first shaft 25. The member that passes through the cover 13 second may be the driving shaft 24. In this case, the driving shaft 24 is defined as the second shaft 27. The projection 71 and the fitting hole 73 are configured in the same manner as in the present embodiment based on the first shaft 25 and the second shaft 27, which are defined as described above.

In the present embodiment, the projection 71 of the positioning portion 14 is arranged on the housing 12 and the fitting hole 73 is arranged in the cover 13. Instead, the projection 71 may be arranged on the cover 13 and the fitting hole 73 may be arranged in the housing 12.

The projection 71 arranged on the housing 12 may be formed integrally with the housing 12. The projection 71 may be a pin that is press-fitted into an insertion hole arranged in the housing 12.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A gear device, comprising:
a housing that accommodates gears;
a cover that covers an opening of the housing; and
a positioning portion that positions the cover relative to the housing; wherein
the cover includes a first bearing that receives a first shaft of one of the gears and a second bearing that receives a second shaft of another one of the gears,
the positioning portion guides the cover to a predetermined position on the housing and includes a projection that projects from one of the housing or the cover parallel to the first shaft or the second shaft and a fitting hole that is formed in the other one of the housing or the cover to receive the projection, and the projection has a length that is set so that when coupling the cover to the housing, in a state in which the first shaft is inserted through the first bearing, the projection enters the fitting hole, and then a distal end of the second shaft enters the second bearing.

2. The gear device according to claim 1, wherein the projection has a distal end that includes a tapered portion.

3. The gear device according to claim 2, wherein the second shaft has a length that is set so that when the tapered portion of the projection is located in the fitting hole, the distal end of the second shaft is fitted in the second bearing.

4. The gear device according to claim 1, wherein
the projection and a wall of the fitting hole form a gap therebetween including a first gap portion in a rotation direction of the first shaft and a second gap portion in a radial direction of the first shaft, and
the first gap portion is smaller than the second gap portion.

* * * * *